Figure 1:
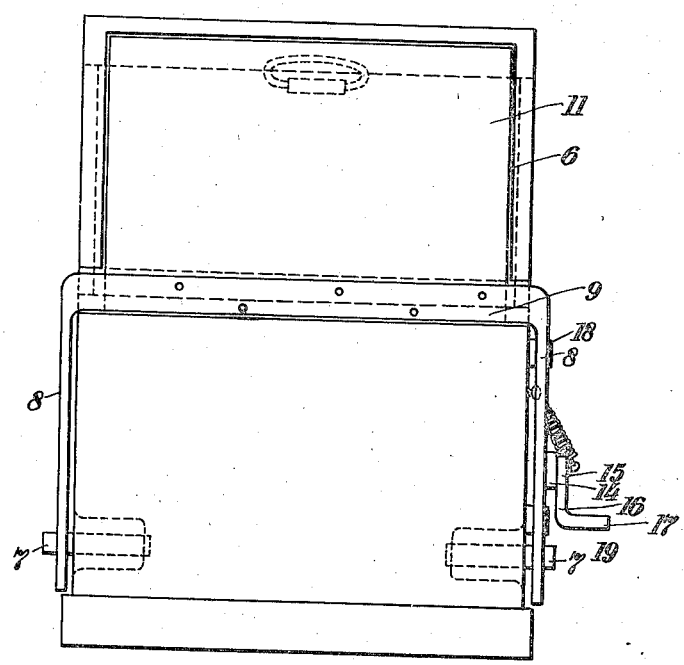

July 4, 1939.  O. JARCHOW  2,164,407

DUST PAN AND COLLECTOR

Filed May 11, 1937

Inventor:
OTTO JARCHOW
By
Haseltine Lake & Co.
Attorneys

Patented July 4, 1939

2,164,407

UNITED STATES PATENT OFFICE 2,164,407

DUST PAN AND COLLECTOR

Otto Jarchow, Scheessel, Germany

Application May 11, 1937, Serial No. 141,893
In Germany June 20, 1936

3 Claims. (Cl. 65—63)

This invention relates to a dustpan and collector, and, more particularly has for its object the provision of a pan which may be manipulated by the foot thus avoiding any stooping upon the part of the user, and which will be of simple and inexpensive construction. The invention seeks to provide a dustpan by which a large quantity of dust and dirt, especially cut hair, may be taken up and deposited in the collector, allowing the receptacle to be carried from point to point without possibility of the dust already brought into the receptacle being whirled up by currents of air and discharged or blown from the receptacle at times when other collections of dust or sweepings are being made. To achieve these and other advantages the receptacle preferably being in the form of a rectangular casing is closed at all sides except the upper part of one side which is provided with an opening to receive the pan. The pan itself is supported at both sides, on arms journaled at the front end of opposite walls of the receptacle. The arms for supporting the pan are journaled in the side walls adjacent the lower front corners of the walls. In the preferred embodiment, the arms normally extend upwardly and adjacent to the side walls throughout a substantial portion of the height of the walls, and are formed to provide a crossbar, which extends across the front of the receptacle, with a surface of the crossbar normally abutting the top edge of the front wall of the receptacle.

The pan is connected to the crossbar and it has such dimensions that it corresponds substantially to the area of the opening in the wall of the receptacle. The back wall of this pan is made sloping for better discharging the received dust. To achieve a simple construction the bent and joined portion of the pivotal supporting arms to which the pan is connected, may be bent into the same sloping plane.

For the reception of the bent and joined portion of the arms the side walls to which the lower ends of the arms are journaled are respectively cut out.

One of the pivotal supporting arms is preferably connected to a spring for normally holding the arms vertical and the pan in raised position, fitting the opening in the receptacle. Moreover a lever is connected to one of the arms which is to be manipulated by the foot of the user against the force of the spring, so that the pan may be readily swung from the closed to the open position. This lever consists preferably of an angled metal strip pivotally connected to one of the supporting arms or to a piece fastened to the arm, a short distance above the pivot point.

Figure 2:
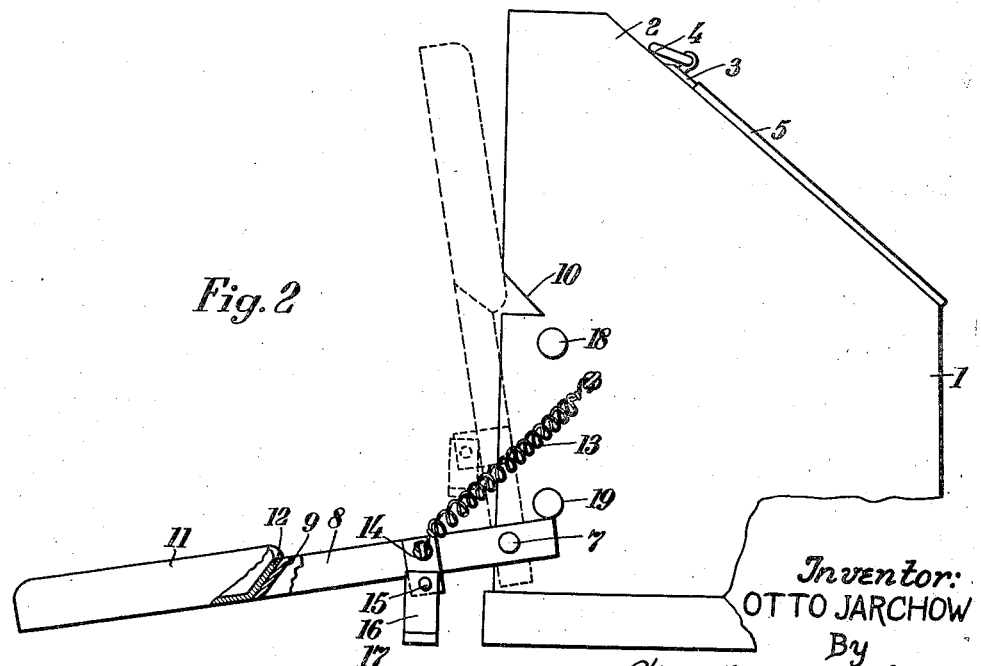

The invention is illustrated in the accompanying drawing and more fully explained in the following description in which:

Fig. 1 is a front elevation of a dust pan and collector embodying my present invention, Fig. 2 is side elevation, partly in section, showing the pan in position to receive sweepings and in dotted lines in a nearly closed position.

In carrying out my invention, I employ a receptacle 1 which is preferably constructed of sheet metal and is in the form of a rectangular casing. The upper edge of each side 2 is made sloping, and adapted to receive a cover 3 provided with a handle 4. The cover may have the form of a slide-plate guided in notches or sliding-bars 5 arranged at the edges of the upper wall. At all sides the receptacle is closed except the upper half of the front side.

It is an object of the invention to provide, in a receptacle for receiving sweepings from a cooperating dustpan, a shield in the form of a wall for a portion of the receptacle at the side having a dust receiving opening. This portion of the wall, or the shield, serves to prevent collected sweepings of light material, such as clippings of hair, being blown out of or discharged from the receptacle, due to the sweepings being picked up and whirled about by currents of air entering the opening, when sweeping operations occur, or when the door to the shop in which the device is used, is opened. In the preferred arrangement shown, the receptacle is closed at all sides throughout a substantial portion of its height and is formed with a dust-receiving opening at the upper half of the collector, the wall enclosing the lower front portion of the receptacle serving as a shield against discharge of the contents due to air currents entering the container during sweeping operations.

At right angles to the front side containing the opening 6, side walls are provided in which journals 7 are mounted at a short distance above the bottom and as near as possible to the front corners of the walls; outside the casing each journal bears an arm 8. Both arms are bent to one another and are joined together to form a crossbar, as seen at 9. This crossbar 9 lies, normally, at a height corresponding to the under edge of the opening 6 in the front side of the casing. For the reception of this bent portion 9 the side walls of the receptacle are cut out preferably in the form of a triangle, as seen at 10. The pan 11 is fastened to the crossbar, or bent portion 9 by means of rivets or other means. The pan consists of a bottom part with side wings and a back wall 12 which is made preferably sloping. The portion 9 is in this case bent in the same sloping plane as the back wall 12.

The breadth and the length of the pan corresponds to the respective dimensions of the opening 6, so that the side wings of the pan exactly fit into the side edges of the opening.

To one of the side walls of the receptacle a coiled spring 13 is fastened which at its outer end is connected to one of the arms 8 at the outside of the casing. By means of this spring the pivotal arms 8 together with the pan are drawn against the receptacle 1, in which position the opening 6 is closed by means of the pan and the bent portion 9 lies then in the cut triangle 10.

As shown, the long section of one of the arms 8 carries an eye or has a piece 14, extending from the arm. To this eye or piece 14 a lever 16 is pivoted on a pin 15. The lever may be constructed of a metal strip being bent with its lower end to a right angle, as seen at 17. This bent portion 17 serves as pedal for the foot of the user.

From the description it is to be understood that by pressing down the pedal 17 with the foot, the pan 11 is lowered by turning the supporting arms 8 with its journals 7 in the bearings or by turning the arms 8 about the fastened journals. This lowering of the pan can be continued against the force of the spring 13, until the front edge of the bottom part of the pan touches the floor. With the pan in lowered position, dust, for example cut hairs, may be swept upon the pan, for which work the user is able to use both of his hands, as the manipulating of the device takes place by means of a foot which rests upon the pedal 17 as long as it is desired to have the pan in the lowered position.

When the pedal is released the arms 8 are drawn back by means of the spring 13. In consequence of this movement of the arms the pan 11 with the swept contacts is raised. When reaching the opening 6 the contents of the pan may slide into the interior of the receptacle. Buffers 18 may be arranged at one or both side walls for stopping and limiting this back movement of the arms 8. Buffers 19 at one or both side walls may serve for stopping the lowering movement of the arms 8 when striking against the backward ends of the arms. As known these buffers may be of elastic material. As the receptacle is closed at all sides at its under half, currents of air cannot find entrance into the interior neither in the raised position of the pan nor in its lowered position.

For discharging the gathered contents out of the receptacle the sloping upper side 2 of the container is opened by pulling the handle 4. In this way the slide-plate 3 is moved upwardly in the sliding-bars 5 thus exposing discharge-opening.

Having thus described my invention, what I claim as new is:

1. A dust collector comprising a receptacle closed at all sides throughout a substantial portion of its height, and formed to provide an opening at the front, upper half of the receptacle, a dustpan normally closing the opening in the receptacle, supporting means for the pan comprising, two side arms rigid at the upper ends with a crossbar, and each journaled at its lower end at the outside of one of two opposite side walls of the receptacle, the front edge of each of the side walls being cut out to receive said crossbar, and the journals for the side arms being mounted in the said side walls, adjacent the lower front corner of the walls, a spring connected at one end to the receptacle, and connected at its opposite end, with one of said side arms, for normally holding the side arms vertical and the pan in raised position, fitting the opening at the front of the receptacle, and a foot-pedal secured to one of said arms, operable to cause the side arms to swing outward and downward with respect to the receptacle, to lower the pan to the surface of a floor.

2. A dust collector comprising a receptacle closed at all sides throughout a substantial portion of its height, and formed to provide an opening at the front upper half of the receptacle, a dustpan having a bottom, side wings, and a back wall, said pan normally closing the opening in the receptacle, supporting means for the pan comprising, two side arms rigid at the upper ends with a crossbar, and each journaled at its lower end at the outside of one of two opposite side walls of the receptacle, means for securing the back wall of the pan to said crossbar, the front edge of each of said side walls being cut out to receive the crossbar, and the journals for the side arms being mounted in the said side walls, adjacent the lower front corner of the walls, a spring connected at one end to the receptacle, and connected at its opposite end, with one of said side arms, for normally holding the side arms vertical and the pan in raised position, fitting the opening at the front of the receptacle, a strip secured to and extending from one of said side arms, and a member having a vertical section pivoted at its upper end to said strip and turned at its lower end to form a horizontal foot-pedal, operable to cause the side arms to swing outward and downward with respect to the receptacle, to lower the pan to the surface of a floor.

3. A dust collector comprising a receptacle closed at all sides throughout a substantial portion of its height, and formed to provide an opening at the front upper half of the receptacle, a dustpan having a bottom, side wings, and a sloping back wall, said pan normally closing the opening in the receptacle, supporting means for the pan comprising, two side arms rigid at the upper ends with a crossbar, and each journaled at its lower end at the outside of one of two opposite side walls of the receptacle, said crossbar being formed with a sloping face corresponding to the sloping back wall of the pan, means for securing the sloping back wall of the pan to the corresponding sloping face of said crossbar, the front edge of each of said side walls being cut out to receive the crossbar, and the journals for the side arms being mounted in the said side walls, adjacent the lower front corner of the walls, a spring connected at one end to the receptacle, and connected at its opposite end, with one of said side arms, for normally holding the arms vertical and the pan in raised position, fitting the opening at the front of the receptacle, a strip secured to and extending from one of the side arms, and a member having a vertical section pivoted at its upper end to said strip, and turned at its lower end to form a horizontal foot-pedal, operable to cause the side arms to swing outward and downward with respect to the receptacle, to lower the pan to the surface of a floor.

OTTO JARCHOW.